April 20, 1965   B. W. BRUNSON   3,178,983
RECIPROCATING COOKIE CUTTER HAVING CUSHIONING MEANS WHICH
AUTOMATICALLY ADJUSTS THE LENGTH OF TOOL STROKE
Filed July 5, 1961   3 Sheets-Sheet 1
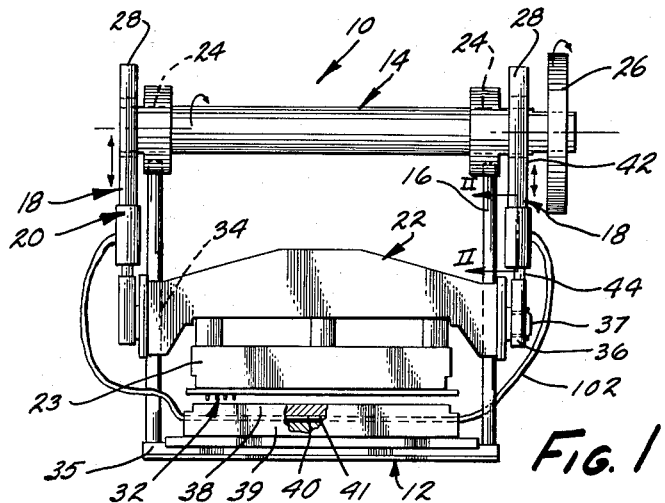
FIG. 1
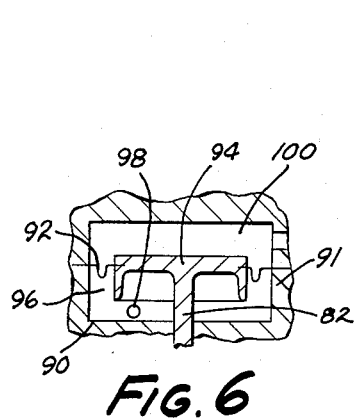
FIG. 6
FIG. 4
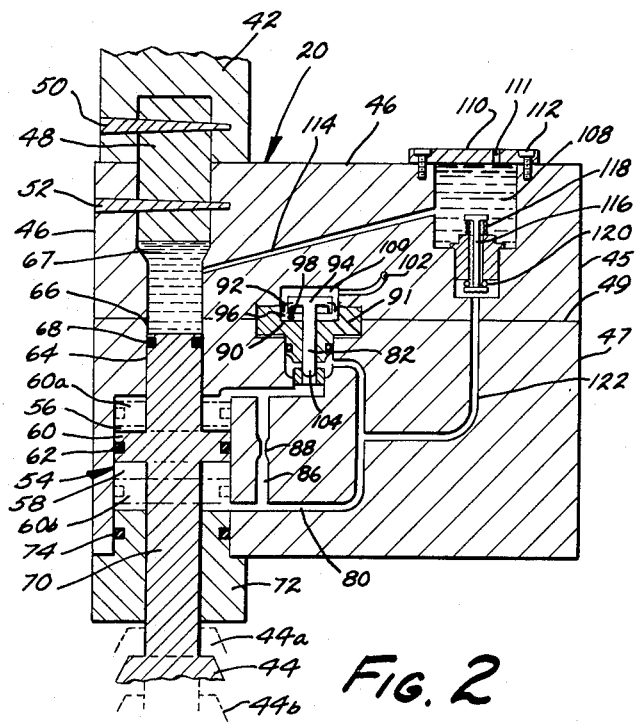
FIG. 2
INVENTOR.
BRUCE W. BRUNSON
BY Price & Heneveld
ATTORNEYS

INVENTOR.
BRUCE W. BRUNSON
BY
ATTORNEYS

United States Patent Office 3,178,983
Patented Apr. 20, 1965

3,178,983
RECIPROCATING COOKIE CUTTER HAVING CUSHIONING MEANS WHICH AUTOMATICALLY ADJUSTS THE LENGTH OF TOOL STROKE
Bruce W. Brunson, Grand Rapids, Mich., assignor to Werner Machinery Company, Grand Rapids, Mich., a corporation of Michigan
Filed July 5, 1961, Ser. No. 122,033
7 Claims. (Cl. 83—530)

This invention relates to power presses, and more particularly to a combination power press and cushioning controller, especially for an automatic cookie cutter, for controlling the force applied by the press.

In using power presses for production operations such as cutting of strip material into a plurality of smaller items, it is highly desirable to control the force with which the upper reciprocating head impresses the object, especially where cutting blades are provided, so that the blades will pass completely through the object and no farther. An important instance of this is cutting of continuous sheets of unbaked pastry dough into items such as cookies or crackers. The sheets are normally carried on long, continuous, flexible belts which pass between the reciprocating cutting head and the bed of the press.

With constant use, the belt gradually wears and becomes slowly thinner. Consequently, the stroke of the press head requires constant adjustment to cause cutter blades on the head or ram to cut clear through the pastry sheet. Heretofore delicate manual adjustment devices have been installed on the reciprocating suspension apparatus of the press head. As the belt continually wears by very small fractions of an inch, the presses are periodically shut down to manipulate the adjustment devices by a slow, tedious process requiring great skill. Because the belt wears gradually and the adjustments are periodical, a certain fraction of the pastry items in the meantime are not cut properly. Also, since belts often wear unevenly, the thicker portions are slashed a certain amount when the press is properly set to accommodate the thinner portions. On the other hand, if the cutter blades are set to accommodate the thicker portions, the pastry sheet will not be properly cut and the uncut items will tend to foul the succeeding production equipment such as the packagers. As will readily be realized, these shortcomings of present presses cause a substantial amount of lost time and expense. The downtime alone to manually readjust the stroke means lost production and requires paying skilled workers. Further, the scrap rate of defective crackers is quite substantial. Then too, the damage caused to belts is significant. Thus, there has existed a great need for a press wherein the stroke of the head would be adjusted automatically with varying belt thicknesses to compensate for gradual wear or uneven wear of the belt and prevent costly downtime, greatly reduce the scrap rate and prevent belt damage.

Another disadvantage associated with prior art presses is the necessity of a very thick and heavy bed to withstand the impact caused by the reciprocating head. The bed must not ordinarily be allowed to move or deform even a fraction of an inch under the impact of the head since even a small movement prevents the complete cutting of the pastry sheet. The heavy bed normally used is consequently very cumbersome. Further, it obviously does not have any "give" even when desired, e.g., if the head stroke accidentally becomes too long to cause the blades to slash the belt, or e.g. if a thick belt portion passes through the press. Further, different dies placed in the reciprocating upper platen usually do not posses the same overall depth from mounting surface to cutting edge. I.e, the cutting surface is not truly co-planar. Thick beds as necessarily used in prior art presses could not "give" in the appropriate portions to prevent belt slashing. Instead, the bed should have been flexible enough to deflect slightly with protruding die portions to give a clean cut without belt damage.

Each die substitution also presently requires a tedious, time-consuming readjustment of the reciprocating platen to accommodate the new die with its different depth from mounting surface to cutting edge.

Therefore, it is an object of this invention to provide a power press possessing automatic, self-regulation of the limit position of the ram; i.e., to provide a reciprocating press, the lower extremity of the ram of which is self-regulating according to force applied thereby. More specifically, it is an object to provide a cushioning means in the suspension apparatus supporting the head, to control the ram lower extremity according to the force applied to the pressed object. The compensating adjustment is continuous in nature, simultaneous with each press stroke, requires no human effort or skill, quickly responds to the need for adjustment, and necessitates no downtime.

It is another object of this invention to provide a reciprocating cutting press having a cushioning control device capable of automatically adjusting the ram lower travel extremity in a manner to prevent incomplete cutting of sheet material normally caused by too short a stroke, to prevent cutting of the support means for the sheet, e.g., a belt normally caused by too long a stroke, and to cause instant, automatic adjustment of the ram travel with a new die.

It is a further object to provide a press having a bed platen assembly that possesses a sufficient amount of flexibility to "give" with die irregularities and thus prevent equipment damage and assure proper cutting, but which also possesses sufficient rigidity and stability to effectuate complete cutting.

It is a further object to provide a press having a head and a bed platen vertically floatable with respect to the press itself. The floating components are capable of always applying the proper amount of force to the article.

Many other objects and advantages of this invention will be apparent upon studying the following specification in conjunction with the drawings in which:

FIG. 1 is an elevational view illustrating the invention on a reciprocating, gear-type, eccentric-shaft, open-back press;

FIG. 2 is a sectional view of the novel cushioning device taken on plane II—II of FIG. 1;

FIG. 4 is a fragmentary sectional elevation view of a spring loaded one-way valve optionally useable in the cushioning device illustrated in FIG. 2;

FIG. 6 is a fragmentary, enlarged, sectional view of the valve apparatus shown in FIG. 2.

Basically, the invention comprises a reciprocating press having in combination a cushioning device on the head or ram for controlling the lower extremity of the ram in accordance with the force applied to the object between the head of the press and the lower platen on the bed of the press. The cushioning apparatus comprises a housing forming a central chamber which is divided into first (upper) and second (lower) fluid-filled chambers by a reciprocable piston or separating member. Conduit means connecting the chambers includes pressure responsive regulator means to allow fluid passage from the upper chamber to the lower when opened by an excess of pressure over a predetermined maximum in the upper chamber due to too great a force being applied by the press. The excessive pressure that will cause a response and opening of the pressure responsive valve means is preferably governed by the pressure of a fluid supporting the lower platen. Second conduit means between the chambers includes a pressure responsive flow regulator means such as a restricted orifice or a one-way valve for allowing fluid flow from the lower chamber back to the upper chamber when insufficient force is applied to the object. The flow is caused by excess pressure in the lower chamber due to momentum of the heavy ram when its lower limit of traverse is not sufficient to contact the pressed article with sufficient force in its downward traverse, and to dead weight of the ram when sitting idle. As an alternative to the double-conduit, double-regulator means arrangment, a single-conduit, single-regulator means arrangement with a single two-way control valve means may be used for two-way flow. This form is not preferred since it is not controlled by fluid pressure under the lower platen. The invention also comprises a relatively thin, flexible, fluid-supported lower platen sufficiently rigid to effectuate the press operation such as cutting, and yet, sufficiently flexible to accommodate belt thickness or die thickness variations.

Figure 3:
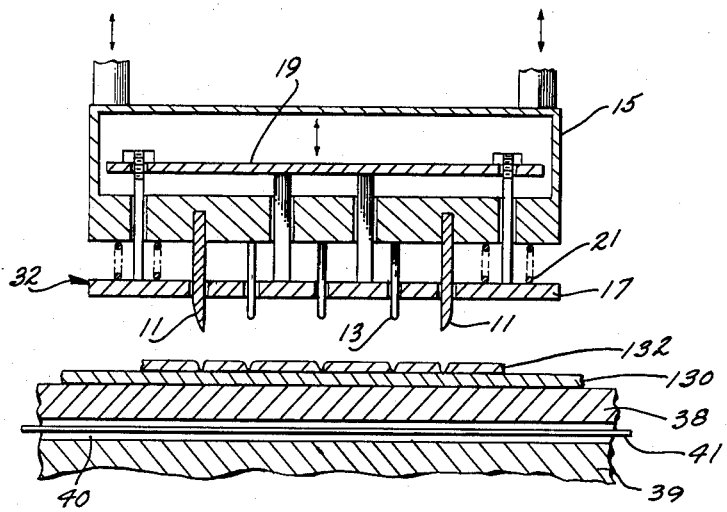
FIG. 3 is a fragmentary sectional elevation view of the power press head and bed of FIG. 1 showing one cutting unit for cutting a pastry sheet supported on a belt into crackers.

Referring now to FIG. 1, the press 10 there depicted is of the eccentric shaft, gear driven, open back type. The press assembly 10 includes a bed 12, an overhead support 14 connected to the bed by guide and support rods 16, suspension arms 18 including cushioning means 20, and a ram or head 22 vertically reciprocable on guide rods 16 upon bearings 34 in the ram. Overhead shaft 14, supported in bearings 24 which may be suitably mounted to support rods 16, is driven by spur gear 26 which in turn may be powered by a suitable electrical motor or the like (not shown). Collars 28 are eccentrically mounted around shaft 14 in a conventional manner. Thus, rotation of gear 26 and of shaft 14 within bearing supports 24 causes vertical reciprocation of suspension means 18, cushioning means 20, and ram 22 upon the guide rods 16 as depicted by the arrow. Rotary bearings 36 are used to connect the lower portion 44 of the suspension arms or tie rods 18 with laterally extending shafts 37 on both sides of the press head. Ram 22 includes an upper platen 23 into which are mounted a series of cutting units 32 when the press is used to cut and dimple crackers. The cutting blades 11 (FIG. 3) are formed in a matrix to sever a continuous sheet of unbaked pastry into a plurality of the crackers. Within the blade matrices are a plurality of dimpling projections 13. Both are affixed to a support housing 15 which is secured to the upper platen in any suitable manner (not shown). A holding and blade-wiping plate 17 is affixed indirectly to a piston plate 19 in housing 15 and biased downwardly by coil springs 21 to hold the cracker dough 132 while being cut and to then wipe it from the retracting blades and dimplers which project through the plate.

The bed 12 of the press is composed of three main sectors comprising a platform 35 for supporting the press, a platen support 39 having a dish-type recess 40 in its upper surface, and a lower platen 38 supported above cavity 40 by a stretchable membrane 41 under which is a pressurized fluid, preferably air, in the cavity. Thus the lower platen is in reality supported on a fluid cushion. Pressurized fluid may be supplied from a suitable source (not shown) to maintain the pressure under the lower platen constant. Platen 38 is formed relatively thin to impart some flexibility to it and thereby enable it to deflect slightly in places where the cutting die is a little thicker and thus presses a little harder, or in places where the belt is a little thicker and would otherwise be slashed with conventional rigid types. The fluid cushion under the platen enables this deflection to occur while still supporting the entire platen to assure proper cutting or the like. The fluid cushion thus is capable of a multiple purpose as will be understood more fully hereinafter.

Referring to FIG. 2, the cushioning device 20 is connected to the upper portion 42 of one of the suspension arms 18 and to the lower portion 44. Portion 42 is connected directly and positively to housing 46 of the cushioning means 20 through an intermediate cylindrical member 48 connected to shaft 42 by tapered pin 52. Obviously other securing devices may be substituted. Within housing 46 is a central cylindrical chamber 54 which is divided into an upper chamber 56 and a lower chamber 58 by a fluid-responsive, dividing member, here depicted as piston 60 which is sealed to the chamber wall with a suitable O-ring 62. Extension 64 sealed to wall 66 of the adjoining and smaller cylinder by O-ring 68, serves as a pressure balancer for the piston so that the area of the piston subjected to liquid pressure will be the same on both of the opposite sides. It also helps to guide the piston. Piston 60 is also connected to shaft 70 extending downwardly out of the housing 46 and connected to lower arm portion 44. A suitable plug 72 sealed by O-ring 74 closes the central chamber and retains the piston in place. This plug may be press fitted or keyed to the housing in any suitable manner (not shown). It should be noted that although a piston is shown as the fluid responsive chamber dividing member, a suitable diaphragm arrangement could conceivably be used in certain instances although this is not preferred. Connecting the upper and lower chambers 56 and 58 is a first conduit 80 controlled by a valve 82 to regulate the fluid passage from upper chamber 56 to lower chamber 58. A second conduit 86 allows passage of fluid from lower chamber 58 to upper chamber 56 through a controlling restricted orifice 88. A certain amount of flow can obviously occur from the upper to the lower chamber through orifice 88 but this is normally insignificant as will be obvious with the explanation of valve 82.

Valve 82 in conduit 80 is normally closed with its head 94 being seated against surface 90 of insert 91. This valve actually comprises a pressure responsive relief means. An annular diaphragm 92 around head 94 of the valve separates enclosed cavity 96, which is open to the atmosphere via port 98, from enclosed cavity 100, which is connected to the lower platen recess 40 via a small outlet 102. To facilitate assembly of these valve parts into the device, the housing 46 is shown as formed of two parts 45 and 47 joined at 49. This entire structure may of course be altered in many ways in consistency with the general principles of operation without departing from the spirit of this invention, with the illustrated cushioning device structure being only exemplary. The head 94 of valve 82 possesses a larger area responsive to fluid from inlet 102 than lower end 104 responsive to liquid from chamber 56. The relative areas are predetermined to obtain a desired multiple for the particular application of the press and thus obtain the proper sensitivity for the cushioning means.

Chambers 56 and 58 as well as conduits 80 and 86 are normally filled with an hydraulic liquid. Enclosed recess 40 under lower platen 38 and cavity 100 adjacent valve 94 are filled with a pressurized fluid such as air. It will be seen that liquid pressure associated with upper chamber 56, and lower valve surface 104 of valve 82 will constantly be pitted against air pressure in cavity 100.

A reservoir 108 sealed by cap 110 which is attached to housing 46 by suitable bolts 112, communicates by conduit 114 with enclosed space 67 above piston extension 64. A one-way valve 116 biased by coil spring 118 to the closed position against seal 120 controls liquid flow from reservoir 108 through conduit 122 to replenish the liquid supply in the upper and lower chambers as needed and in a manner to be described. Enclosed space 67 and reservoir 108 are normally substantially filled with hydraulic liquid. If desired, two one-way valves may be positioned in reservoir 108 to independently supply liquid to the two chambers 56 and 58 (see, e.g., the preferred form of the invention in FIG. 7).

*Operation*

When it is desired to use the press depicted for cutting continuous sheets of pastry into crackers, for example, a continuous flexible belt 130 carrying a pastry sheet 132 is allowed to traverse continuously over the lower platen 38 beneath ram 22 from front to back of the press between the straddling guide rods 16. The press reciprocates constantly to successively cut unbaked crackers from the dough and simultaneously dimple them.

During operation, while the sheet is being pressed (in a cutting operation or the like), the suspension arms 18 will be under compression. With the retraction of the head, the arms will be under tension. Further, if the reciprocating head does not impact against a solid object as it reaches the lowermost point of the stroke, the momentum of the ram will cause an unusually large tension force to be momentarily exerted on the suspension arms. It should be noted that a normal pastry sheet does not present any appreciable impact resistance to the cutter blades on the head, while the carrying belt under the pastry does.

Now, assuming the press head possesses the proper traverse to cut the pastry 132 clear through when carried on a belt 130, the cutting units 32 will repeatedly stamp out unbaked crackers with blades 11 and dimple them with dimplers 13. If a thicker section of belt raises the pastry layer 132 a fraction of an inch, the ram will then tend to travel too low. With the novel compression controlling means, as the blades 11 pass through the soft pastry and impact against the relatively hard belt, a large reaction compressive force will be exerted through the lower portion 44 of the suspension means, thus applying a similar compressive force to shaft 70 and piston 60. This causes a large pressure increase in the liquid in upper chamber 56. This increased pressure is also applied to lower surface 104 of valve 82. The pressure in enclosed cavity 100 above the valve, on the other hand, remains substantially constant even though a greater pressure is now exerted against the lower platen. This constant pressure is achieved by using a relatively small conduit 102 to connect recess 40 with cavity 100. Thus, momentary pressure increased in recess 40 are not conducted quickly enough to cavity 100 to have any effect. The increased liquid pressure against lower valve surface 104 therefore becomes greater than the standard pressure in cavity 100 to shift valve 82 upwardly and open conduit 80 to allow liquid flow from upper chamber 56 to lower chamber 58. This causes the piston 60 to shift upwardly as depicted (greatly exaggerated) in phantom at 60a. Since this sequence occurs in both suspension devices, the effect is to shorten the overall length of the suspension arms as at 44a. With the shorter arms, the lower extremity of the ram is lessened the exact amount necessary to prevent cutter blades 11 from slashing belt 130. This is true because the large compressive force on the piston is lowered to a minimal value when the blades no longer impact the belt so severely. Then the pressure in chamber 56 resumes its normal value and valve 82 recloses under the constant air pressure in cavity 100. These automatic adjustments will take place each time a thicker belt portion appears. The adjustment permits the cutter or whatever to again apply the original impact force since only the excess force is dissipated.

If, on the other hand, after the cushioning means has raised the lower extreme position or limit of the upper platen to accommodate a thicker belt section, a thinner belt portion passes through the press, or if a gradual overall wear of the belt occurs, the platen will not travel low enough to cut the pastry items clear through. If the blades do not pass through the soft sheet and thus do not contact the relatively hard belt, the lowering ram will retain its momentum after it reaches its lowermost position and will thus momentarily impart a greatly increased tension force upon the suspension arms. This tends to jerk piston 60 downwardly to increase the pressure in the liquid in lower chamber 58. This increased pressure will not open valve 82 since it reacts on the side surface of the valve. On the other hand, it will spurt through the restricted orifice 88 of conduit 86 into the upper chamber. If a large belt differential occurs, two or three strokes of the ram may be necessary to pass sufficient liquid from chamber 58 to chamber 56 to allow the piston to lower as depicted greatly exaggerated in phantom at 60b. Normally the belt thickness changes will be very gradual and thus a continual adjustment occurs with no extra strokes being necessary. This effectively increases the suspension arms length as shown by the position of lower suspension means portion 44b. The contact of the cutter blades 11 with belt 130 limits this downward movement in the afore-described manner.

Instead of the restricted orifice 88, a one-way valve 140 as depicted in FIG. 4 may be substituted as the governing means in conduit 86. Valve body 140 is normally biased to a closed position against valve seat 144 by coil spring 142 compressed between valve body 140 and retaining ring 143. Spring 142 is provided with a predetermined compressive force to allow valve 140 to open at a predetermined increase in pressure in conduit 86 and lower chamber 58. This allows liquid flow from lower chamber 58 to upper chamber 56, thereby lowering the traverse of the head and equalizing the pressure.

Liquid in reservoir 108, vented to the atmosphere at 111, replenishes chamber 58, and indirectly chamber 56, if the supply in these chambers should become low for some reason due to the suction thereby created. The differential pressure causes valve 116 to open against the bias of spring 118 to allow liquid flow into conduit 122 for replenishing the supply. This arrangement constantly replenishes the hydraulic supply during the operation of the press. If liquid passes from chamber 56 past O-ring 68 into chamber 67, this liquid may then flow up passageway 114 into the reservoir 108.

It will be obvious to those in the art after studying the above descriptions that the type of press used may be widely varied, that the particular material operated upon or the particular operation performed may be widely varied using the inventive apparatus without departing from the scope of the invention. Also, the valving structure may be varied in many respects depending upon manufacturing techniques available and expedient.

In regard to valve 82, it should be noted that it may be operated using a standard fluid pressure in cavity 100 from an independent source. It is preferred, however, to have cavity 100 connected directly to recess 40 beneath the lower platen since this assures that the air pressure exerted on valve 82 (to cause a readjustment of the head) will be a predetermined multiple of that pressure under the bed platen. This is highly advantageous since if the pressure under the lower platen were greater, the platen would possess little if any "give" and would cause belt damage before the cushioning means had readjusted the ram lower limit. If the pressure under the lower platen were less, it would "give" too readily and would thus cause incomplete cutting of the sheet. To assure that these two pressures are directly related, a conduit connection is made between cavity 100 and recess 40. This conduit is purposely kept small so that a momentary increase in fluid pressure in recess 40 under the platen will not be transmitted to cavity 100 since this would increase the liquid pressure necessary in the upper chamber 56 to open valve 82. The two sections of the press thus act as a self-adjusting, damage preventing floating mechanism.

Figure 5:
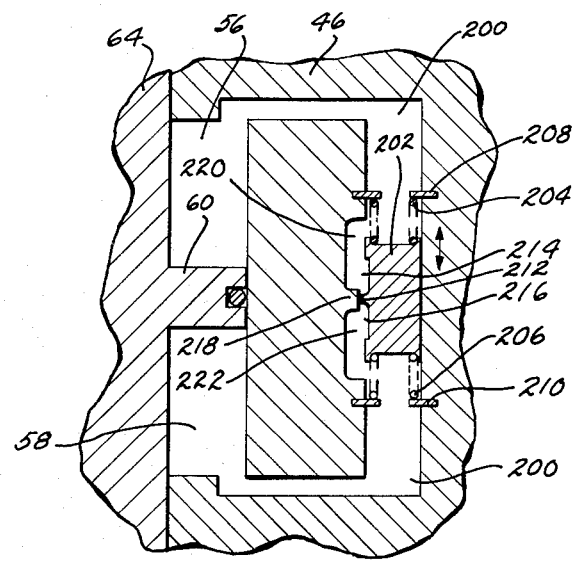
FIG. 5 is a two-way control valve optionally usable in the device illustrated in FIG. 2.

A slightly modified conduit and valving arrangement (FIG. 5) may be used if desired, but does not allow the control of the ram traverse in accordance with the lower platen-fluid cushion pressure. Only one conduit 200 connects lower chamber 58 to upper chamber 56 and vice versa, and includes a suitable spool valve including valve body 202. Two compression springs 204 and 206 between the body 202 and retaining rings 208 and 210 respectively maintain the body 202 in an equilibrium position, with projection 212 between valve recesses 214 and 216 being in contact with projection 218 between housing recesses 220 and 222. Normally, therefore, no flow takes place past valve body 202. A pressure increase in upper chamber 56 of a predetermined value will cause downward shifting of body 202 against control spring 206 to cause liquid flow successively through recesses 220, 214 and 222 to the lower chamber for raising the lowest point of the reciprocating ram. A pressure increase in the lower chamber of a predetermined value will cause upward shifting of body 202 against control spring 204 to allow liquid flow through recesses 222, 216 and 220 into the upper chamber 56 for lowering the ram extremity. The two springs 204 and 206 are each provided with the desired compressibility to control liquid flow in either direction.

Figure 7:
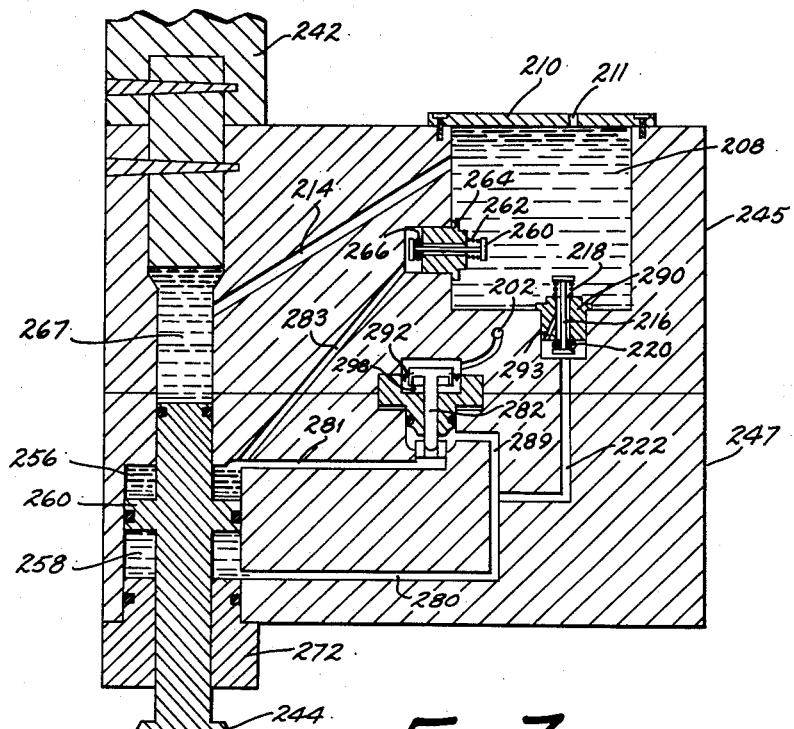
FIG. 7 is a sectional view of a modified form of the cushioning device illustrated in FIG. 2.

A further modification of the apparatus and the preferred form is illustrated in FIG. 7. This cushioning device includes the housing formed of parts 245 and 247 enclosing piston 260, which is in turn connected to lower portion 244 of the suspension arms. Upper portion 242 is secured to the housing as before. Adjacent piston 260 are upper chamber 256 and lower chamber 258, the latter being closed by plug 272. Allowing liquid flow from chamber 256 to 258 is conduit means 281, 289, and 280 including pressure responsive regulator means including valving means 282 slidable in insert 293 and responsive to open by liquid pressure actuation from chamber 256 and conduit 281 on its lower surface. Valve 282 is responsive to close (downwardly) by the fluid pressure under the lower press platen communicable with the top of the valve via port 202. Port 298 under the head of valve 282 is open to atmosphere. Diaphragm 292 seals the areas above and below the head of the valve from each other.

Reservoir 208 having cap 210 and vented to atmosphere at 211 communicates with chamber 267 via passageway 214 as before. Check valve 216 biased by spring 218 to seal against insert 290 with annular seal 220 enables liquid replenishing via conduits 222 and 280 to chamber 258. Similar check valve 260 biased by spring 262 to seal against insert 264 with seal 266 replenishes the liquid in chamber 256 via conduit 283.

A special restricted orifice 293 extends through insert plug 290 to replace restricted orifice 88 as illustrated in FIG. 2.

In operation if the upper platen tends to travel too low to create a large compressive force on the suspension arms, the excess pressure in chamber 256 will open valve 282 against the pressure on the top of valve 282 (a predetermined multiple of the fluid pressure under the lower platen) and thereby allow liquid flow through conduits 281, 289 and 280 to chamber 256.

If, on the other hand, the upper platen does not lower far enough, the excess pressure in chamber 258 will cause liquid flow through conduits 280 and 222, orifice 293 and into reservoir 208. Piston 260 will thus lower a slight amount to lower the upper platen traverse limit. The lowering piston causes a suction to occur in chamber 256, i.e., a pressure differential with respect to the atmospheric pressure reservoir 208 to cause valve 260 to open for liquid flow down conduit 283. As previously indicated, the double check valve assembly (valves 216 and 260) may be used with the device in FIG. 2, except that orifice 293 will not be used due to the presence of orifice 88.

Although a particular type of press is illustrated with respect to the invention, it should be understood that any suitable press may be substituted, including for example, crank presses, toggle joint presses, cam presses, knuckle joint presses, direct acting presses, pillar presses, etc.

Further, although within the narrower aspect of this invention the preferred use of the novel press and cushioning device is to cut pastry sheets on moving belts, the press and cushioning device could be adapted for cutting of other types of materials where a force differential exists with respect to impact of the head with the material to be cut and that of the press bed. Of course, a belt may or may not be used. The control valves would necessarily have to be adjusted and possibly modified somewhat to accommodate the particular material. Then too, the invention is not to be confined to cutting operations since many other operations performed on presses involve a force differential between the impact of the working die on the worked material on the one hand, and the working die on the press bed on the other. A few examples of such operations are bending, curling, forming, and the like.

It will be apparent to those in the art that a great many variations and modifications may be made in the press itself, in the structure of the cushioning device, in the conduit arrangement, in the control valving, and in the placement and mounting of the cushioning device into the particular press utilized. A list of such obvious variations within the spirit of this invention would be superfluous in this specification. This invention is not to be limited by the foregoing illustrative material but only by the scope of the appended claims and the equivalent structures to those defined therein.

I claim:

1. A press comprising a bed including a lower platen; said lower platen being supported on said bed by a pressurized fluid; reciprocable suspension means above said lower platen; a ram supported by said suspension means and reciprocable therewith for applying force to an object between said platen and ram; said suspension means including a fluid cushioning means for preventing said force from exceeding a predetermined value; said cushioning means being operated in response to the excess of the pressure of said cushioning fluid over a multiple of the normal pressure of said lower platen supporting fluid.

2. A press comprising, a lower platen; said platen being supported by a fluid cushion at a predetermined normal pressure; reciprocable suspension means above said lower platen; an upper platen secured to said suspension means and reciprocable therewith; forming means depending from said upper platen to act upon an object between said platen; said cushioning means containing a cylinder; a member dividing said cylinder into two chambers; conduit means connecting said two chambers; automatically responsive flow control regulator means in said conduit means; a pressurized liquid in said chambers and conduit; conduit means extending between said lower platen cushion and said regulator means; said regulator means being normally held closed by a multiple of the fluid pressure supporting said lower platen; said regulator means being opened against the bias of said pressurized fluid by pressurized liquid in one of said chambers in response to a predetermined force applied by said upper platen; said valve when opened allowing liquid flow from said one chamber to the second chamber to thereby allow said dividing member to shift and prevent said force from exceeding said predetermined amount by changing the length of said suspension means.

3. A press comprising, an overhead support means; an upper platen; suspension means supporting said upper platen beneath said support means; a bed platen beneath said upper platen; said suspension means and upper platen being vertically reciprocable for applying force to an object between said upper and bed platens; said suspension means comprising an upper portion connected to said support means, a lower portion connected to said upper platen, and an intermediate portion comprising a control means; said control means being fixedly secured to said upper portion; said control means including a housing having a main chamber therein; a piston reciprocable in said chamber and dividing it into upper and lower chambers; said piston being directly connected to said lower portion of said suspension means; an hydraulic liquid in both of said chambers; conduit means joining said upper and lower chambers for controlled flow of said fluid therebetween; automatically responsive valving means associated with said conduit means to control said fluid flow; said valving means being normally closed, and being opened automatically against a bias by excessive fluid presure to allow liquid flow beneath said chambers in response to a predetermined force applied by said platens, whereby said excessive pressure is alleviated and said force is not exceeded by changing the length of said suspension means.

4. A press comprising, an overhead support means; a ram; suspension means supporting said ram beneath said support means; a bed platen beneath said ram and supported on a pressurized fluid cushion; said suspension means and ram being vertically reciprocable for applying a force to an object between said rim and bed platen; said suspension means comprising an upper portion connected to said support means, a lower portion connected to said ram, and an intermediate portion comprising a force control means; said control means being fixedly secured to one of said portions; said control means including a housing having a main chamber therein; a piston reciprocable in said chamber and dividing it into upper and lower chambers; said piston being directly connected to the portion of said suspension means not secured to said one portion; a liquid in both of said chambers; a conduit means joining said upper and lower chambers for flow of said liquid therebetween; a valve associated with said conduit means and automatically responsive to control said liquid flow; said valve being normally closed and being opened against a bias which is exerted by a multiple of said pressurized fluid supporting said bed platen, to allow limited liquid flow between said chambers in response to a predetermined force applied to said platens to thereby prevent said force from being exceeded by changing the length of said suspension means.

5. A press capable of automatically adjusting its reciprocable stroke length and maintaining said adjusted stroke length comprising a bed; reciprocable suspension means above said bed; a ram secured to said suspension means and reciprocable therewith for applying force to an object between said bed and ram; said suspension means including a cushioning means containing a cylinder having closed ends; a member dividing said cylinder into two chambers and normally positioned generally intermediate said cylinder ends to be movable in either direction; a first conduit means connecting said two chambers; a flow control valve in said conduit; a liquid in said chambers and conduit; said valve being normally closed and being automatically opened in response to a predetermined liquid pressure in one of said chambers as a result of a predetermined force being applied by said ram to allow liquid flow to the other of said chambers, to adjust the length of said suspension means and the stroke of said press and prevent said applied force from exceeding said predetermined amount; a second conduit means between said chambers; flow control means in said second conduit unresponsive to pressures caused by weight of said ram on said suspension means and therefore normally closed to prevent significant flow from said second chamber to said first chamber to maintain the adjusted length of said suspension means and the press stroke, and being responsive to increased pressure caused in said second chamber by momentum of said ram when not contacting said object with sufficient force, to permit flow from said second chamber to said first chamber for lengthening of said stroke means and the press stroke.

6. A press comprising, a bed including a lower platen; said platen being supported by a fluid cushion at a predetermined normal pressure; reciprocable suspension means above said lower platen; an upper platen secured to said suspension means, and including cutting blade means depending therefrom; said upper platen being reciprocable with said suspension means to apply a cutting force to an object between said platens; said cushioning means including a cylinder; a piston dividing said cylinder into a first and second chamber; a conduit means connecting said chambers; a flow-control valve in said conduit; a liquid in said chambers and conduit; conduit means extending between said lower platen cushion and said valve; said valve being normally closed by the fluid supporting said lower platen at said predetermined normal pressure; said valve being opened against the bias of said pressurized fluid by said liquid when said liquid in said first chamber is subjected to an increase in pressure by said piston in response to a predetermined force applied by said platens; said valve when opened allowing liquid flow from said first chamber to said second chamber to thereby allow said piston to shift and prevent said force from exceeding said predetermined amount; a second conduit means between said chambers; a restricted orifice in said second conduit means; said orifice permitting limited flow from said second chamber in response to increased pressure caused in said second chamber by said piston due to momentum or weight of said upper reciprocating platen when not contacting said object with sufficient force.

7. A reciprocating press comprising a bed, a ram, suspension means for said ram enabling said ram to repeatedly apply momentary pressure to an object on said bed; drive means for repeatedly reciprocating said ram for repeated momentary pressure application; said suspension means including cushioning means comprising a cylinder and piston forming a closed liquid chamber; said cylinder and piston being normally held in relatively fixed relationship to each other by confined liquid in said chamber; an outlet relief passageway from said chamber, including a control valve responsive to the pressure of liquid in said chamber on one end tending to open said valve; said bed including a platen supported above a fluid chamber on pressurized fluid therein, and a small diameter pressure conduit extending from said fluid chamber to the opposite end of said control valve to apply a closing pressure thereto determined by the stabilized pressure under said platen, but small enough to prevent transmission of momentary pressure changes in said fluid chamber.

References Cited by the Examiner

UNITED STATES PATENTS

| | | | |
|---|---|---|---|
| 2,438,951 | 4/48 | Stephens | 83—543 |
| 2,538,403 | 1/51 | Watson | 100—211 |
| 2,646,745 | 7/53 | Seltzer | 100—53 |
| 2,666,123 | 1/54 | Blackman | 83—639 X |
| 2,882,816 | 4/59 | Van Doorn | 100—53 |
| 2,931,290 | 4/60 | Davidson | 100—211 |
| 2,980,013 | 4/61 | Swick | 100—257 |
| 3,005,404 | 10/61 | Tucker | 100—257 |

FOREIGN PATENTS 577,609    5/46    Great Britain.

WILLIAM W. DYER, Jr., *Primary Examiner.*
CARL W. TOMLIN, *Examiner.*